United States Patent [19]
Ängquist

[11] 4,431,956
[45] Feb. 14, 1984

[54] DRIVE EQUIPMENT

[75] Inventor: Lennart Ängquist, Enköping, Sweden

[73] Assignee: ASEA Aktiebolag, Västerås, Sweden

[21] Appl. No.: 300,538

[22] Filed: Sep. 9, 1981

[30] Foreign Application Priority Data

Sep. 25, 1980 [SE] Sweden .................. 8006706

[51] Int. Cl.³ .............................................. H02P 3/22
[52] U.S. Cl. ..................................... 318/759; 318/762
[58] Field of Search ............... 318/370, 375, 376, 757, 318/758, 759, 762, 345 CB

[56] References Cited

U.S. PATENT DOCUMENTS

| | | | |
|---|---|---|---|
| 3,657,625 | 4/1972 | Miller et al. | 318/376 |
| 3,930,191 | 12/1975 | Loderer | 318/376 |
| 4,039,914 | 8/1977 | Steigerwald et al. | 318/375 |
| 4,051,418 | 9/1977 | O'Berto et al. | 318/759 |

FOREIGN PATENT DOCUMENTS 53-142613 12/1978 Japan.

OTHER PUBLICATIONS

Murphy, J. M. D., *Thyristor Control of A.C. Motors*, Pergamon Press, 1973, pp. 134–135.

*Primary Examiner*—David Smith, Jr.
*Attorney, Agent, or Firm*—Pollock, Vande Sande & Priddy

[57] ABSTRACT

A drive equipment has an AC motor and a self-commutated static converter for transmitting electrical power between the motor and a network for driving and braking the motor. The equipment has braking resistors, each of which is connected between a DC terminal and an AC terminal of the converter. Connected in series with each braking resistor is a thyristor which acts to control the current through the braking resistor.

9 Claims, 8 Drawing Figures

DRIVE EQUIPMENT

TECHNICAL FIELD

The present invention relates to drive equipment for an AC motor which equipment comprises a self-commutated DC/AC converter for transmitting electrical power from a network to the motor for driving the motor and for transmitting electrical power from the motor to the network for braking the motor, the converter having at least two AC terminals and two DC terminals, the equipment also comprising a braking resistor controlled by a switching member for absorbing electrical power from the motor during braking thereof. The invention also relates to an improved traction equipment for an electrically powered vehicle.

DISCUSSION OF PRIOR ART

An equipment of this type is previously known from, for example, Elektrische Bahnen 77(1970)H 10, pp. 272–283. This equipment has a converter whose AC terminals are connected via a transformer to an AC network consisting of a contact line. With the aid of a mechanical electric switch, a braking resistor can be connected between the AC terminals of the converter, the converter thus being simultaneously disconnected from the network. The braking resistor is connected when the contact line is not able to take up the electrical power fed back during regenerative braking.

A disadvantage with this connection is that the converter is disconnected from the contact line when the braking resistor is switched in. Although the contact line is unable to take up the whole braking power, it can often take up part of it. Consuming the entire braking power in the braking resistor in such cases leads to unnecessary energy losses.

A mechanical electric switch is slow, and therefore during braking, heavy overvoltages may occur before the braking resistor can be switched in, for example in the case where the pantograph of a vehicle bounces on the pantograph contact line or during passage of the pantograph past an interruption in the contact line. To reduce such overvoltages to a harmless level, special precautionary measures in the form of energy stores and overvoltage protection means are required.

The mechanical electric switch of the prior art arrangement could very well be replaced by a controllable semiconductor element, for example a thyristor. However, since the electric switch is a switching means, this would require two sets of antiparallel-connected thyristors, which would be a relatively space-demanding and expensive solution. Further, the thyristors which in that case would be disposed in series with the braking resistor between the AC terminals of the converter, would be subjected to high reverse blocking and off-state voltage stresses because of the overvoltages occurring during the commutations of the converter. The thyristors would therefore have to be designed with high voltage capability, and they would have to be provided with heavily dimensioned RC circuits. The equipment would therefore become expensive and the losses in the RC circuits would be high.

DISCLOSURE OF THE INVENTION

The invention aims to provide an equipment in which the switching members which are used for connection of the braking resistor are subjected to low voltage stresses and are thus smaller and subjected to lower losses. The invention further aims to provide an equipment in which overvoltages are effectively prevented. The invention also aims to provide an equipment which makes it possible to control in a simple manner the power taken up by the braking resistor and which makes it possible to connect the braking resistor without disconnecting the converter from the network.

According to one aspect of the invention, there is provided drive equipment for an AC motor which equipment comprises, a self-commutated DC/AC converter for transmitting electrical power from a network to the motor for driving the motor and for transmitting electrical power from the motor to the network for braking the motor, the converter having at least two AC terminals and two DC terminals, a braking resistor and a controllable semiconductor element in series with the braking resistor, the series-connected resistor and element being connected between one of the AC terminals of the converter and one of its DC terminals for absorbing electrical power from the motor during braking thereof.

BRIEF DESCRIPTION OF DRAWINGS

The invention will now be described, by way of example, with reference to the accompanying drawings, in which.

DESCRIPTION OF PRIOR ART ARRANGEMENT

Figure 1:
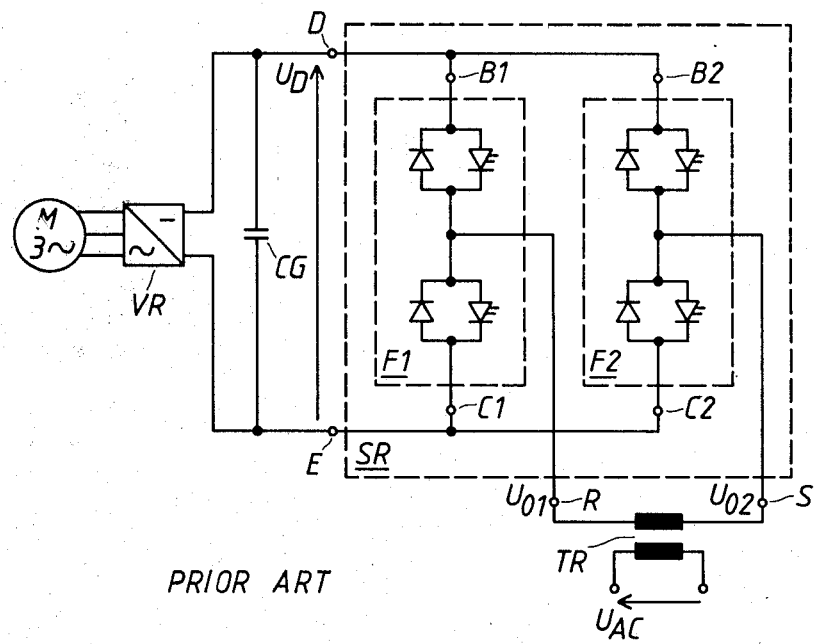
FIG. 1 shows a known form of drive equipment.

FIG. 1 shows a drive system, known per se, for a three-phase AC motor M. An AC/DC converter SR has its AC terminals R and S connected via a transformer TR, to an AC network with a voltage $U_{AC}$. The AC network may, for example, consist of a contact line for the power supply of an electrically operated vehicle, and the motor M can then be the drive motor of the vehicle. The DC terminals D and E of the converter SR are connected to the DC terminals of a self-commutated DC/AC inverter VR, which delivers an alternating voltage with a variable frequency and amplitude to the motor M for control of its torque and speed in a manner known per se. The connection between the converter SR and the inverter VR constitutes a DC intermediate link with a voltage $U_D$.

The converter SR has two phase groups, F1 and F2, with direct voltage connections B1, B2, C1 and C2 and with the alternating voltage connections R and S. The converter SR is self-commutated and operates as an alternating voltage source of variable frequency and amplitude. By changing the frequency, and thus the phase position of the alternating voltage, of the converter in relation to the AC voltage supply, the active power flux can be controlled, for example so that the intermediate link voltage $U_D$ is maintained constant. By changing the amplitude, the reactive power flux can be controlled, for example to maintain it at a constant value, which may be zero. This requires a certain inductance between the converter SR and the AC network, and if the leakage inductance of the transformer TR is insufficient for this purpose, a separate inductor can be connected between the converter SR and the AC network.

The motor M can be both driven and braked electrically, and both the inverter VR and the converter SR are therefore arranged to be able to transmit active power in either direction.

If necessary, smoothing capacitors (such as the capacitor CG) or other filter elements may be arranged in the intermediate link between the converter SR and the inverter VR. Other smoothing or filtering elements (not shown) can also be provided on the alternating voltage side of the converter SR.

Figure 2:
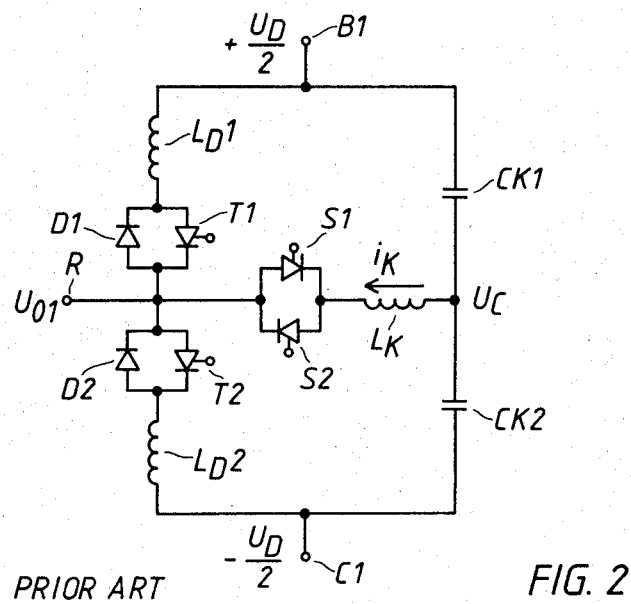
FIG. 2 shows in detail one of the phase groups of the converter in the equipment according to FIG. 1.

FIG. 2 shows in more detail a known construction for the phase group F1 of the converter SR shown in FIG. 1. Two main thyristors T1 and T2 are arranged in series with each other between direct voltage terminals B1 and C1. The thyristors T1 and T2 are antiparallel-connected with respective diodes D1 and D2. Inductors $L_D1$ and $L_D2$ are arranged in series with the thyristors T1 and T2 to limit the current differential coefficient when the thyristors start conducting. The alternating voltage terminal R is connected to a connection point between the main thyristors T1 and T2. The voltage at the terminal R, relative to a fictitious neutral point of the direct voltage, is expressed as $U_{01}$, that is, the terminals B1 and C1 are assumed in the following to be positioned at the potentials $+U_D/2$ and $-U_D/2$. The phase group F1 has a turn-off circuit consisting of two commutating capacitors CK1 and CK2 having a common connection point $U_C$, a commutating inductor $L_K$ and two turn-off thyristors S1 and S2.

Figure 3:
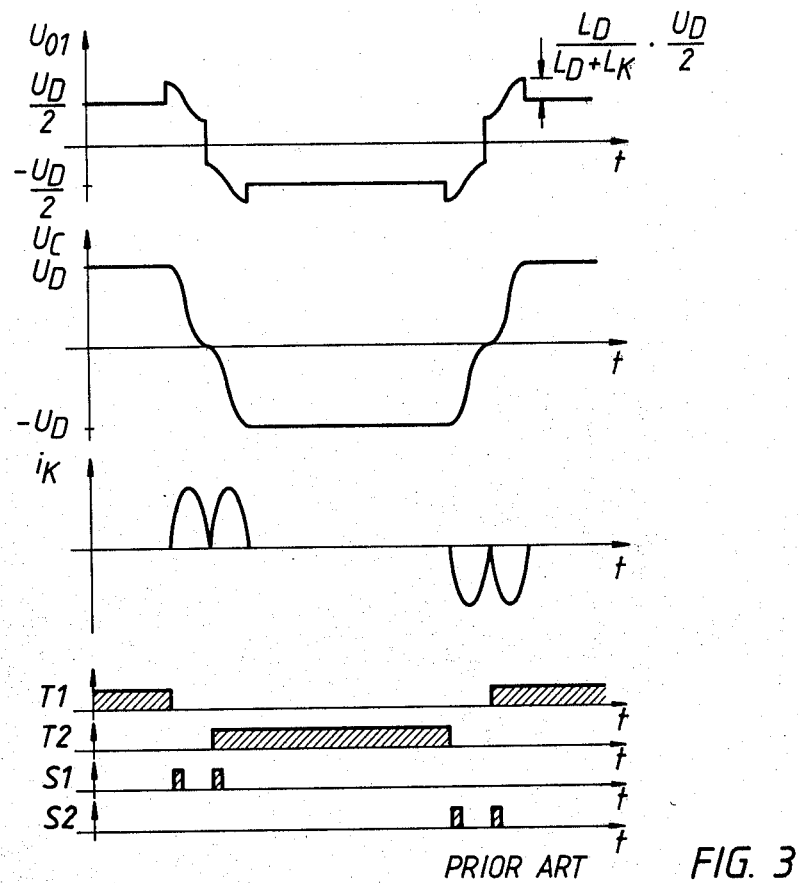
FIG. 3 shows some of the curve configurations and the control signals for the converter of the equipment according to FIG. 1.

FIG. 3 shows, in descending order, and all plotted as functions of time t, the output voltage $U_{01}$, the potential $U_C$ at the connection point $U_C$, the current $i_K$ through the commutating inductor $L_K$ and the control pulses to the main thyristors T1 and T2 and to the turn-off thyristors S1 and S2. The output voltage $U_{01}$ assumes alternately the values $+U_D/2$ and $-U_D/2$. At the beginning and end of each commutation, however, an overvoltage of a peak magnitude $L_D/L_D+L_K \cdot U_D/2$ will appear. Since the inductance $L_D$ of the inductor $L_D1$ or $L_D2$ cannot be made too small (and often constitutes a considerable part of the total inductance $L_D+L_K$) these commutating overvoltages will be of a considerable magnitude. If a braking resistor, in series with a switching member (e.g. a thyristor switch), is arranged between the alternating voltage terminals of the converter the commutating overvoltages will give rise to high voltage stresses on the switching member.

DESCRIPTION OF EQUIPMENT ACCORDING TO THE INVENTION

Figure 4:
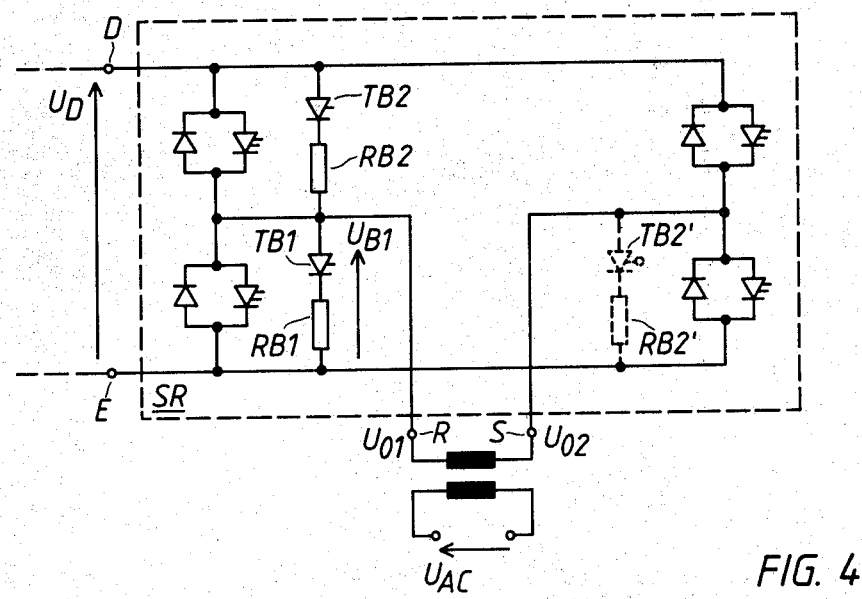
FIG. 4 shows one example of an equipment according to the invention.

FIG. 4 shows how the braking resistors and the braking thyristors are arranged according to the invention in a converter SR of drive equipment of the kind described in FIGS. 1 to 3. Between one alternating voltage terminal R and one direct voltage terminal E of the converter SR, a braking resistor RB1 is connected in series with a braking thyristor TB1, and between the terminal R and the other direct voltage terminal D, a second braking resistor RB2 is connected in series with a second braking thyristor TB2.

It can be shown in a simple manner that the voltage stresses on the switching members TB1 and TB2 will be considerably lower than with previously known switches or switches of a similar kind. If (see FIG. 2) the inductances $L_D=0$ and $L_K\neq 0$, the maximum off-state voltage is $U_D$, and if $L_D\neq 0$ and $L_K=0$, the maximum off-state voltage is $3/2 U_D$. The maximum reverse blocking voltage is only $U_D/2$ (for $L_K=0$ and $L_D\neq 0$). This permits the choice of a thyristor with a considerably lower voltage strength than has been possible previously. Further, the lower working voltage of the thyristor makes possible a smaller dimensioning of the RC circuit to which the thyristor is always parallel-connected, and this results in a considerable reduction of the losses in this circuit and thus in the equipment as a whole.

The resistor RB2 and the thyristor TB2 may possibly be series-connected between the terminals S and E, as indicated by dashed lines in FIG. 4 (RB2' and TB2', respectively).

According to another alternative within the scope of the invention, four braking resistors each with a series-connected braking thyristor can be arranged, one between terminals R and D, one between terminals R and E, one between terminals S and D, and one between terminals S and E.

The braking thyristors may be switched in when the network is unable to receive fed-back braking power and can be held in this condition by means of a continuous control signal for as long as the braking power feedback condition remains. As a criterion for switch-in of the braking thyristors may be used, for example, the fact that the line voltage $U_{AC}$ exceeds a certain predetermined level.

Alternatively, the braking thyristors can be phase-angle controlled, whereby the power taken up by the braking resistors is continuously controllable. The braking thyristors can then be controlled in such a manner, for example in dependence on the line voltage, that the braking resistors take up the surplus energy which the network is unable to absorb.

Figure 5:
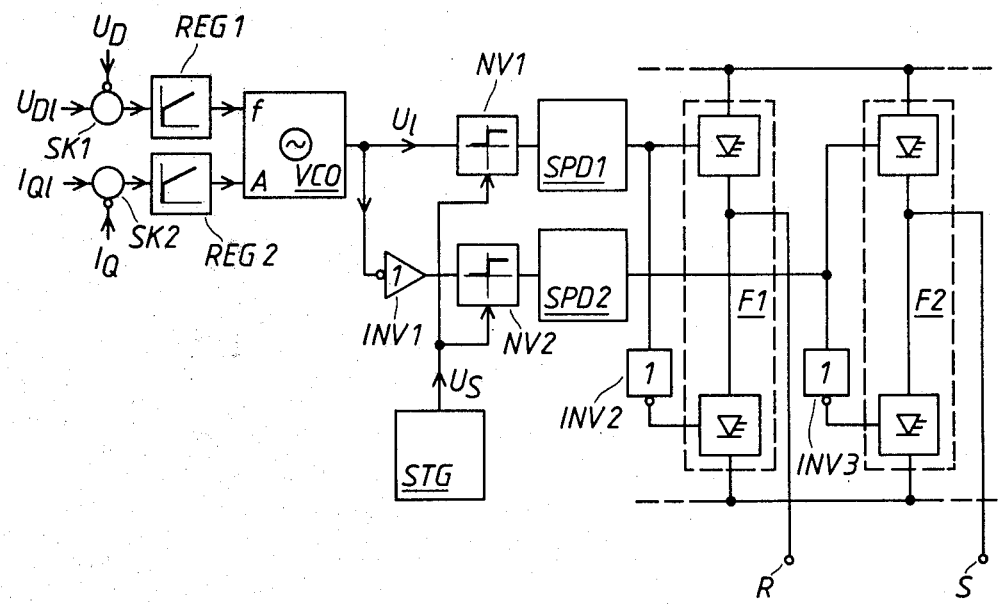
FIG. 5 shows the control system for the converter of the equipment according to FIG. 4.

FIG. 5 shows an example of the control of the two phase groups F1 and F2 of a converter which are shown only schematically in this Figure. A controllable oscillator VCO delivers a sinusoidal control voltage $U_1$. The frequency of the control voltage $U_1$ is varied by means of a first control signal fed to a control input f of the VCO and the amplitude of the voltage $U_1$ is varied by means of a second control signal fed to a control input A of the VCO. A difference former SK1 is supplied with a reference value $U_{D1}$ for the intermediate link voltage and with the actual value $U_D$ of this voltage and determines the difference between these two input values. The difference signal is supplied to a regulator REG1 with a PI characteristic, and is used to control the frequency of the control voltage $U_1$ and thus the frequency of the converter and the active power flux so that the intermediate link voltage is maintained constant. A second difference former SK2 is supplied with a reference value $I_{Q1}$ for the reactive current which flows between the converter and the network, as well as with the actual value $I_Q$ of that reactive current. A regulator REG2, analogous to the regulator REG1, generates a control signal which, via the control input A of the oscillator VCO, controls the amplitude of the control voltage $U_1$ and thus the voltage of the converter and thereby maintains the reactive power flux between the converter and the network at the desired value.

A triangular wave generator STG generates a triangular wave $U_S$ with a frequency which is considerably higher than the frequency of the control voltage $U_1$. In a level flip-flop NV1, $U_S$ and $U_1$ are compared. When $U_1$ becomes greater than $U_S$, the flip-flop NV1 causes the upper one of the two main thyristors of the phase group F1 to conduct via a control pulse device SPD1, and when $U_1$ drops below $U_S$, the flip-flop NV1 causes the lower one of the main thyristors of the phase group F1 to conduct via SPD1 and an inverter INV2. (For the sake of clarity, the turn-off thyristors and their control are not shown in FIG. 5.) The control voltage $U_1$ is supplied via an inverter INV1 to a second level flip-flop NV2, where $-U_1$ and $U_S$ are compared and control of the two main thyristors of the phase group F2 is carried out in a similar manner, using a control pulse device SPD2 and a further inverter INV3.

Figure 6:
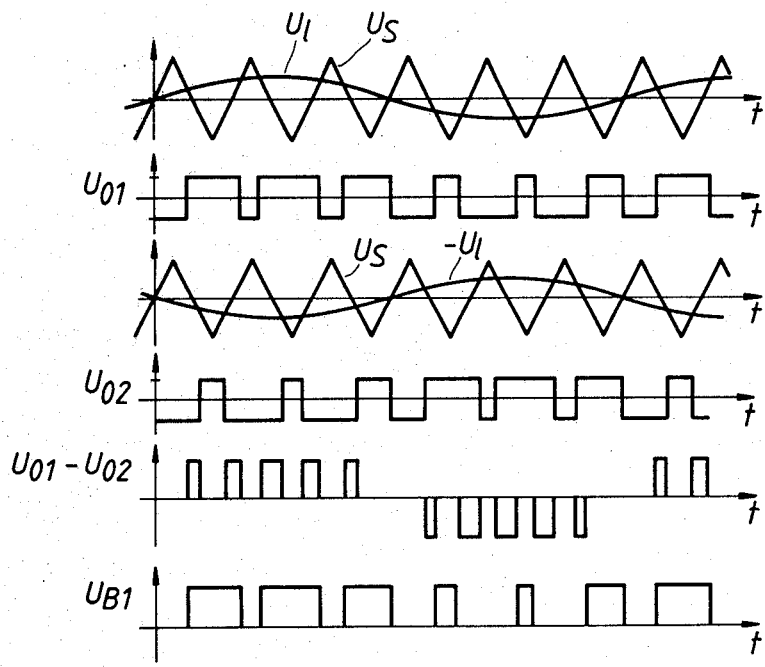
FIG. 6 shows some of the magnitudes occurring in the equipment according to FIG. 4 as functions of time.

FIG. 6 shows, all as functions of time t, the voltages $U_1$, $U_S$, $U_{01}$, $-U_{02}$, the output voltage $U_{01}-U_{02}$ of the converter, and the voltage $U_{B1}$ appearing across one of the braking circuits (see FIG. 4). The output voltage $U_{01}-U_{02}$ contains a fundamental tone with the same frequency as that of the control voltage $U_1$ and with an amplitude which is a function of the amplitude of the control voltage.

Figure 7:
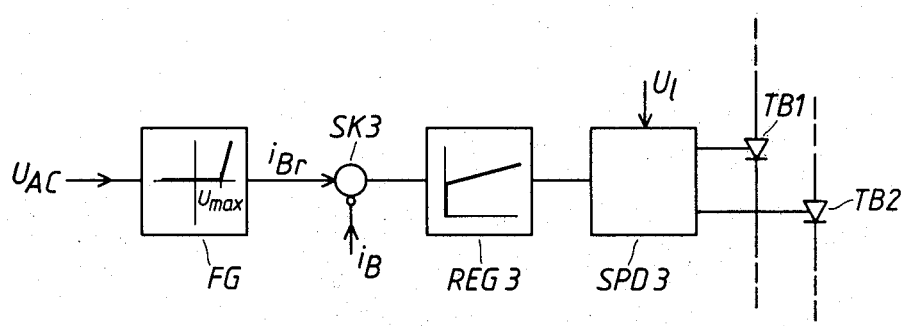
FIG. 7 shows the control system for the braking resistors in the equipment of FIG. 4.

FIG. 7 shows one possible way of controlling the braking current. The line voltage $U_{AC}$ is sensed and supplied to a function generator FG. If during regenerative braking, the AC network is unable to absorb the fed-back braking power, the line voltage will rise. When it exceeds a value $U_{max}$, which exceeds the normal voltage level, the function generator FG delivers a reference signal $i_{Br}$ for the braking current which increases rapidly with the line voltage. This signal is compared in a difference former SK3 with the measured value $i_B$ of the braking current. The difference is supplied to a regulator REG3 with a PI characteristic. The output signal from the regulator is supplied to a control pulse device SPD3 which controls the braking thyristors TB1 and TB2 with a variable control angle (in relation to the on-state voltage $U_1$) which is dependent on the output signal of the regulator. As soon as the line voltage $U_{AC}$ tends to increase above the value $U_{max}$, the thyristors are given maximum DC voltage and supply a braking current which increases rapidly with the line voltage. The braking resistors will then be automatically activated and take up the surplus of fed-back energy from the motor which the network is unable to absorb. This prevents the occurrence of overvoltages on the AC contact line and in the intermediate link.

In the case where the other phases of the converter are also provided with braking resistors, these can be controlled in the same way as that described with reference to FIG. 7.

As will be clear from FIG. 6, the braking current has several zero intervals for each period of the control voltage $U_1$. Each braking thyristor is turned off in connection with the commutation of the corresponding thyristor in the converter (if its recovery time is sufficiently short), that is, at least once for each period of the triangular wave $U_S$. By delaying the subsequent turn-on of the thyristor by a variable amount, continuous control of the braking current can be obtained in a manner which is an alternative to that described above. The control circuits for the braking thyristors can be designed in basically the same way as the circuit shown in FIG. 7, but with the difference that the control pulse device SPD3 is supplied with the voltage $U_S$ as its reference voltage (instead of $U_1$) and delays the turn-on of the braking thyristors by an amount dependent on the output signal of the regulator REG3, for example relative to the peaks of the voltage $U_S$. With this arrangement of control circuits for the braking thyristors, reduced pulsation of the braking current and thus a more uniform braking effect is obtained.

Figure 8:
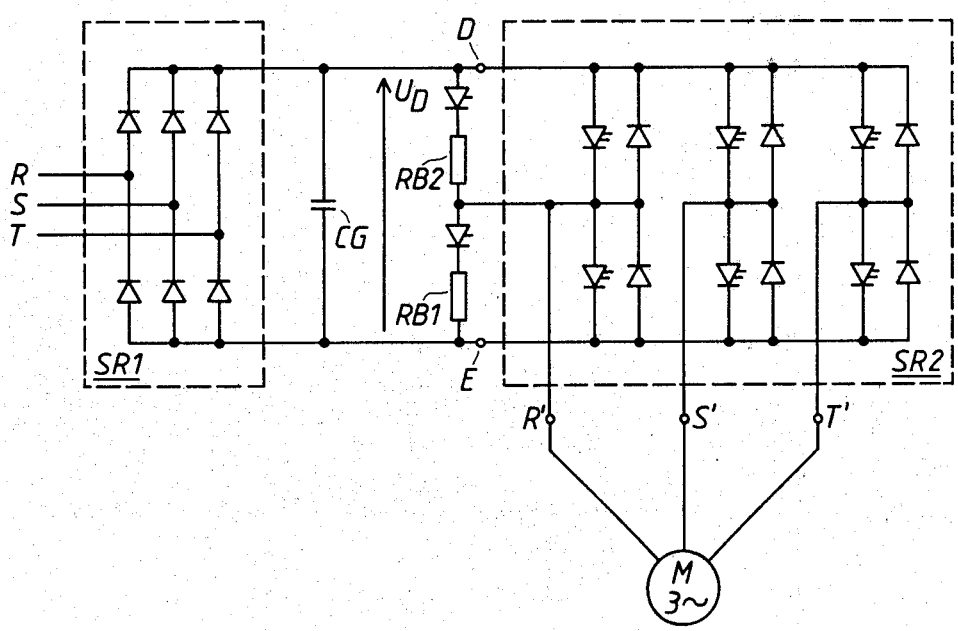
FIG. 8 shows a second example of drive equipment according to the invention.

FIG. 8 shows an alternative embodiment of drive equipment according to the invention. A drive equipment is arranged for supply (driving and braking) of a three-phase AC motor M from a three-phase AC network RST. The network, via a converter SR1, supplies a direct voltage link with a smoothing capacitor CG. The converter SR1 may be an uncontrolled diode rectifier. A self-commutated inverter SR2 has its direct voltage terminals connected to the intermediate link and its alternating voltage terminals connected to the motor M. By varying the frequency (and amplitude) of the alternating voltage of the inverter SR2, the torque and speed of the motor M can be controlled. The motor can be the drive motor for any type of industrial equipment or machine. During braking of the motor M, active power is fed from the motor via the inverter to the intermediate link.

Between one of the alternating voltage terminals (R') of the inverter SR2 and each of the direct voltage terminals (D and E), two braking resistors RB1 and RB2 are connected, each one being in series with a braking thyristor for controlling the connection of the respective braking resistor and for controlling the flow of braking current through the respective braking resistor. The braking thyristors are controlled in a manner analogous to that described in connection with FIG. 7, but with the difference that the braking current is now controlled in dependence on the intermediate link voltage instead of on the line voltage.

In the equipment shown in FIG. 8 only one phase (R') of the inverter SR2 is provided with braking resistors. Alternatively, however, the other two phases S' and T' can also be provided with braking resistors and braking thyristors, in precisely the same way as has been shown for the phase R'. This results in reduced pulsations of the braking power and in pulsations of a higher frequency, thus generating a more even braking effect.

The equipment shown schematically in FIG. 8 may alternatively be used in a vehicle supplied with direct voltage, the converter SR1 then being omitted so that the inverter SR2 is then fed directly from a contact line, or the like, carrying the direct voltage. The braking resistors can then be controlled, for example, so that the direct voltage is prevented from exceeding a predetermined level.

The converter SR1 in FIG. 8 can alternatively be a single- or multi-phase controllable mains-commutated or self-commutated converter. In the case of a drop out of line voltage, the converter can suitably be blocked. Should this occur during braking, the braking may continue undisturbed, but the braking resistors will then have to be able to absorb the entire braking power.

Instead of controlling the current through the braking resistors, as described above, the braking resistors can be switched in and be maintained continuously switched in for as long as there is a need to absorb braking power from the motor. This need may be established, for example, by sensing a line voltage, a mains voltage or an intermediate link voltage.

The specific embodiments described above with reference to FIGS. 4 to 8 may be modified in many ways within the scope of the following claims.

What is claimed is:

1. Drive equipment for an AC motor, which equipment comprises,
    a self-commutated DC/AC converter for transmitting electrical power from a network to the motor for driving the motor and for transmitting electrical power from the motor to the network for braking the motor, the converter having at least two AC terminals and two DC terminals,
    a smoothing capacitor connected between said DC terminals,
    a braking resistor and
    a controllable semiconductor element in series with the braking resistor,
    the series-connected resistor and element being connected between one of the AC terminals of the converter and one of its DC terminals for absorbing electrical power from the motor during braking thereof, and
    control members for control of the current through the braking resistor in dependence on the voltage appearing on that side of the converter to which power is supplied during braking of the motor.

2. Drive equipment according to claim 1, in which the equipment comprises two braking resistors connected to one of the AC terminals of the converter, each said braking resistor being respectively connected in series with a controllable semiconductor element and each series-connected resistor and element being connected between the AC terminal and a respective one of the DC terminals.

3. Drive equipment according to claim 1, in which the equipment comprises one braking resistor for each phase group of the converter, the different braking resistors each being series-connected to a respective controllable semiconductor element and each series-connected resistor and element being connected between one of the AC terminals of the converter and one and the same DC terminal.

4. Drive equipment according to any of claims 1, 2 or 3, in which the or each controllable semiconductor element is a thyristor.

5. Drive equipment according to any of claims 1, 2 or 3, in which the equipment includes control members for controlling the current through the braking resistors by means of phase angle control of the controllable semiconductor elements.

6. Drive equipment according to any of claims 1, 2 or 3, in which said network is an AC network and said DC terminals of said converter are connected to the motor via a DC/AC inverter.

7. Drive equipment according to any of claims 1, 2 or 3, in which said network is a DC network and the AC terminals of said converter are connected to the motor.

8. Traction equipment for an electrically powered vehicle, comprising
    an AC drive motor for the vehicle,
    a DC/AC converter for transmitting electrical power from a supply source to the motor for driving the latter and for transmitting electrical power from the motor to the supply source on braking of the motor, said converter having
    at least two AC terminals and
    two DC terminals,
    a smoothing capacitor connected between said DC terminals,
    a series-connected braking resistor and controllable semiconductor element connected between an AC terminal and a DC terminal, for absorbing electrical power from the motor during braking thereof, and
    control members for control of the current through the braking resistor in dependence on the voltage appearing on that side of the converter to which power is supplied during braking of the motor.

9. Traction equipment as claimed in claim 8, in which the AC terminals of the converter are connected to the motor and the DC terminals are connected to an AC supply source via a rectifier unit.

* * * * *